Figure 4:
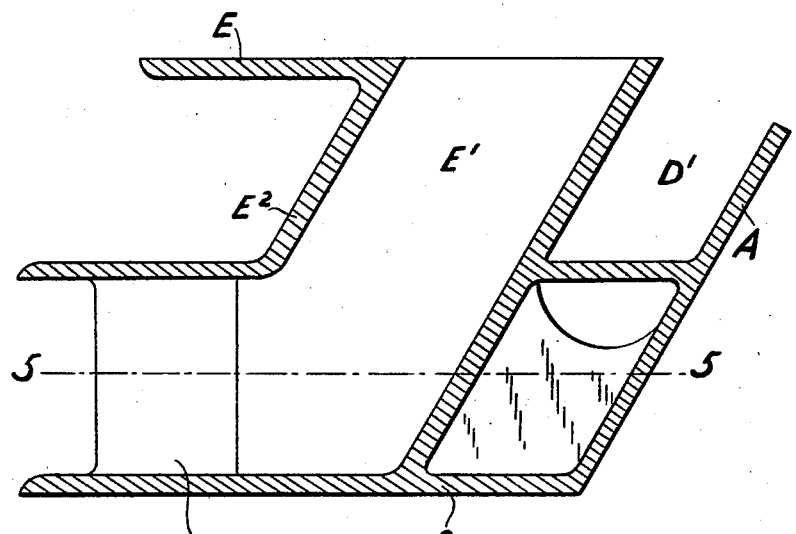

No. 677,599. Patented July 2, 1901.
W. J. ROBINSON & H. HIGGINS.
CHEMICAL APPARATUS.
(Application filed Jan. 19, 1901.)
(No Model.) 4 Sheets—Sheet 1.
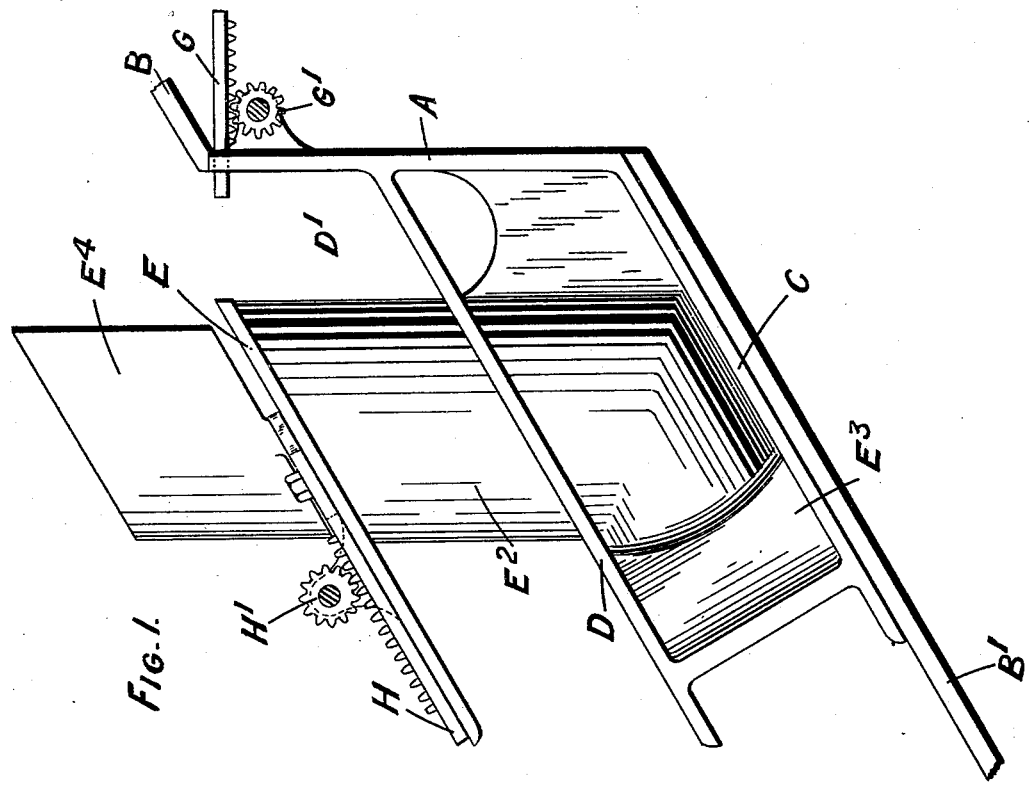
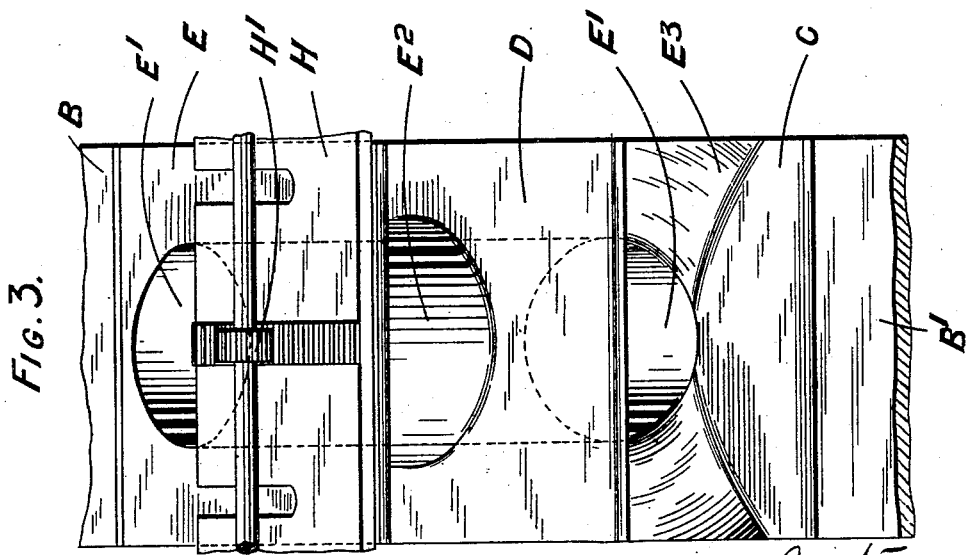

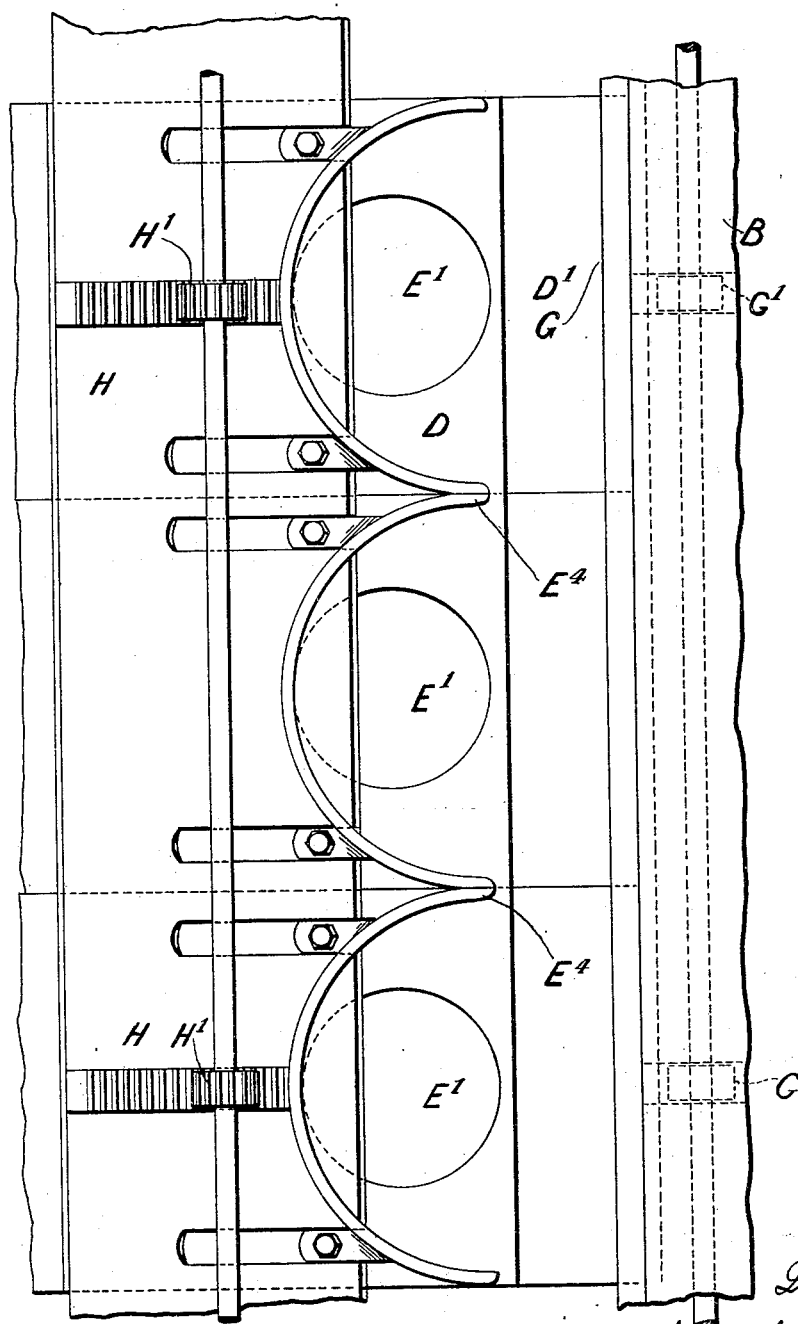

No. 677,599. Patented July 2, 1901.
W. J. ROBINSON & H. HIGGINS.
CHEMICAL APPARATUS.
(Application filed Jan. 19, 1901.)
(No Model.) 4 Sheets—Sheet 3.

No. 677,599. Patented July 2, 1901.
W. J. ROBINSON & H. HIGGINS.
CHEMICAL APPARATUS.
(Application filed Jan. 19, 1901.)
(No Model.) 4 Sheets—Sheet 4.
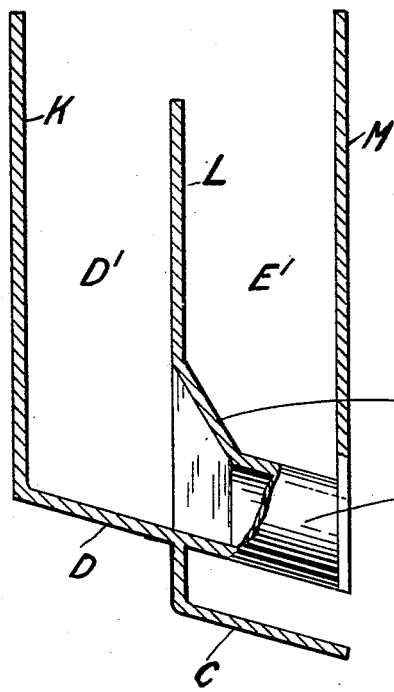
FIG. 6.
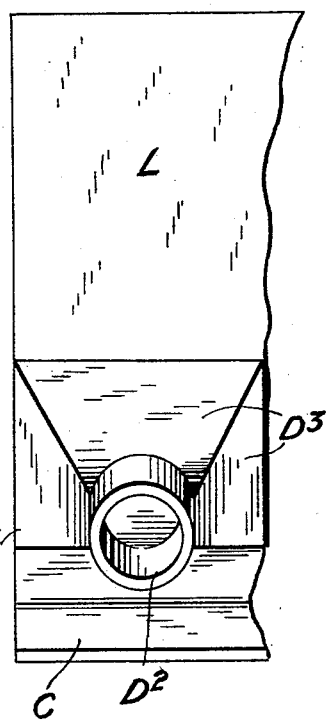
FIG. 7.
FIG. 8.

UNITED STATES PATENT OFFICE.

WILLIAM JOHN ROBINSON AND HENRY HIGGINS, OF ANNAN, SCOTLAND.

CHEMICAL APPARATUS.

SPECIFICATION forming part of Letters Patent No. 677,599, dated July 2, 1901.

Application filed January 19, 1901. Serial No. 43,929. (No model.)

*To all whom it may concern:*

Be it known that we, WILLIAM JOHN ROBINSON and HENRY HIGGINS, of the Provost Oat Mills, Annan, county of Dumfries, Scotland, have invented certain new and useful Improvements in or Relating to Apparatus for the Treatment of Fluids or Flowing Substances; and we do hereby declare the following to be a full, clear, and exact description of the same.

This invention relates to apparatus for the treatment of flowing substances, its object being to provide a device for transposing the strata of a flowing substance which is passing over a surface. The surface may be a heating or cooling surface or may be covered with some substance over which a liquid or a gas is to be passed, and in order that the action may be complete transposing devices are employed to bring different portions of the flowing substance successively into contact with the guiding-surface, so that every part of the flowing substance under treatment may successively be effected by such contact with the surfaces. Such a device may be employed in processes where various kinds of fluids are operated upon.

Examples of flowing substances which may be treated by apparatus constructed according to this invention are a gas in the manufacture of bleaching-powder from chlorin and lime, a liquid in the process of purifying by lixiviation, a pulverulent material in the drying of powders, and a granular substance in the drying of grain. It is to be understood that the application of this invention is not confined to these processes, but may be resorted to in all cases where it is desired to transpose the strata of a flowing substance.

Apparatus constructed according to this invention comprises a plurality of stepped surfaces, down which (or, in the case of a gas lighter than the atmosphere, up which) the flowing substance whose strata it is desired to transpose is caused to flow. One or more transposing devices are situated at each step, each of these devices including a guiding-surface intermediate of the two surfaces, a passage from the first surface to the intermediate guiding-surface, and a second passage adapted to carry flowing substance from the first surface to the second beneath the intermediate guiding-surface. The parts are so arranged that the lower stratum of the flowing substance on the first surface passes over the opening of the first passage and is conducted by the second passage beneath the intermediate guide into contact with the second surface, the original lower stratum being delivered from the intermediate guide onto the top of the flowing substance.

Figure 5:
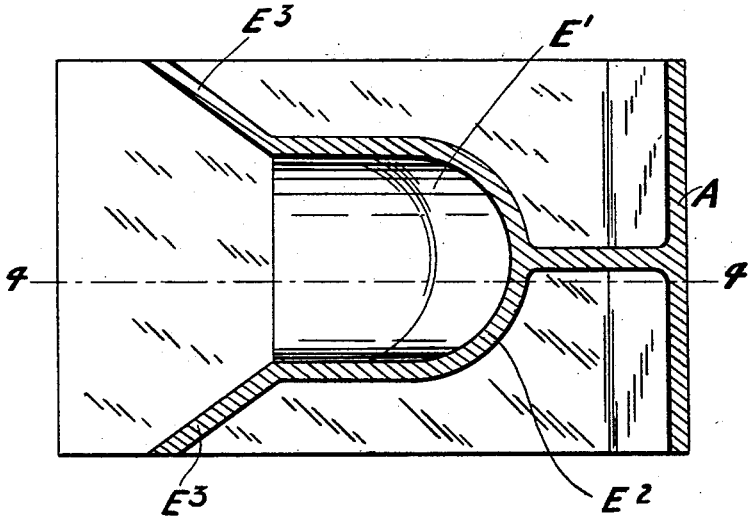

In the accompanying drawings, Figure 1 is an elevation of the device for transposing the strata of a flowing substance constructed according to this invention. Fig. 2 is a plan showing three of these devices arranged side by side. Fig. 3 is an end elevation of Fig. 1 with the guide-wall hereinafter referred to removed for the sake of clearness. Fig. 4 is a vertical section of the transposing device, taken on line 4 4 of Fig. 5; and Fig. 5 is a horizontal section taken on the line 5 5 of Fig. 4. Fig. 6 is a vertical transverse section, taken on the line 6 6 of Fig. 7, of a modified form of the device illustrated in Figs. 1 to 5, inclusive. Fig. 7 is a longitudinal elevation of the device illustrated in Fig. 6 with the two front walls removed. Fig. 8 is a plan of Fig. 6.

Like letters indicate like parts throughout the drawings.

In carrying out this invention a plurality of inclined surfaces for guiding a flowing substance is provided and a transposing device— such as illustrated in Figs. 1 to 5, inclusive— is located at the space between adjacent surfaces. The guiding-surfaces for the flowing substance may be of any length or width and their inclination may be varied as desired. The transposing device comprises a back wall A, which is preferably arranged to extend vertically below the edge of one of the aforesaid surfaces B. A bottom wall C extends from the back wall A and forms a practical continuation of the second surface B'. A guide for the flowing substance, hereinafter referred to as the "intermediate" guide, (in the present example consisting of a shelf D,) is situated intermediate of the surfaces B B' in such a manner as to leave a clear passage D' between it and the upper surface B. Beyond the opening of the passage D' a top wall E is provided, preferably situated above the plane of the surface B. A second passage E' extends from the top wall E to the bottom wall C and is preferably made in the form of a tube or the like E², passing through the intermediate guide or shelf D and having a flared open end E³, facing the lower surface B'. Preferably a plurality of the devices described above are placed side by side, so as to fill up the space between the surfaces B B' throughout their whole length. The openings of the passages D' E' are preferably controlled by suitable dampers or the like G H, supported in guides and adjustable in any convenient manner—such as by hand-operated pinions G' H', gearing with racks arranged transversely on the dampers.

In the operation of the first construction the flowing substance whose strata it is desired to transpose is caused to flow down the surfaces B B', its rate of travel being controlled in any convenient manner. When the flowing substance arrives at the edge of the surface B, if there be sufficient quantity its lower stratum will pass down the passage D' onto the intermediate guide D, while its upper stratum will be carried over the opening of the passage D' and will be led by the passage E' through the guide or shelf D onto the second surface B'. The original upper stratum will thus be led into contact with the plate B', while the original lower stratum will flow from the intermediate guide D onto the top of the flowing substance. It will be seen that the strata of the flowing substance thus passing through the device have been transposed in such a manner that the portion of the substance which was the lowest on the surface B has become the uppermost portion upon the surface B'.

In order to prevent any of the substance under treatment from flowing over the lower edge of the top wall E instead of down the passage E', a guide-wall E⁴, preferably curved, as shown, may be bolted to the top wall E, Figs. 1 and 2. Where a damper H is employed, the guide-wall E⁴ is secured so as to leave a sufficient space between it and the top wall E to allow the operation of the damper beneath it, and in this case the damper would be slotted for the reception of the fastening devices, or an independent damper might be arranged for each of the passages E'.

In the modification illustrated in Figs. 6, 7, and 8 three upright walls K L M are provided, and of these the wall K corresponds to the wall A in the construction illustrated in Figs. 1 to 5, inclusive, its upper edge being arranged adjacent to the edge of the upper surface B. The wall M extends up approximately to the same height as the wall K, while the wall L, dividing the space between K and M, is formed somewhat shorter, as shown in Fig. 6. The space between the walls K and L forms the passage D', leading to the intermediate guide D, while the space between the walls L and M forms the passage E', leading to the bottom wall C and thence to the lower surface B'. The intermediate guide D is extended through the passage E' by means of a pipe or the like D², connected to the passage D' by a suitable funnel D³.

The operation of the second construction, as illustrated in Figs. 6, 7, and 8, is similar to that of the one illustrated in Figs. 1 to 5, inclusive, the lower stratum of the substance flowing on the surface B falling through the passage D', while the upper stratum is led by the passage E', beneath the intermediate guide D, onto the second surface B', where it forms the lower stratum. The original lower stratum will be delivered by the pipe D² onto the top of the substance which formerly constituted the upper stratum. A heavy gas (such as chlorin in the preparation of bleaching-powder) will flow over the surfaces in substantially the same manner as a liquid; but in the case of a light gas (such as coal-gas) the gas will pass upward underneath a guiding-surface, and thus the transposing device will require to be reversed, the end E being the lower and the end E³ being the higher.

What we claim as our invention, and desire to secure by Letters Patent, is—

1. In apparatus for the treatment of flowing substances the combination of an inclined surface to receive a flowing substance, a second inclined surface to receive the substance from the first surface the lower end of the first surface being vertically above the upper end of the second and separated from it, means for interrupting the upper stratum of the substance flowing on the first surface and conveying it into contact with the second surface and means for interrupting the lower stratum of the substance flowing on the first surface and conveying it onto the top of the substance flowing on the second surface.

2. In apparatus for the treatment of flowing substances the combination of an inclined surface to receive a flowing substance, a second inclined surface to receive the substance from the first surface the lower end of the first surface being vertically above the upper end of the second and separated from it, means for interrupting the upper stratum of the substance flowing on the first surface and conveying it into contact with the second surface, means for interrupting the lower stratum of the substance flowing on the first surface and conveying it onto the top of the substance flowing on the second surface and means for controlling the proportion of substance conveyed by the intermediate surface.

3. In apparatus for the treatment of flowing substances the combination of an inclined surface to receive a flowing substance, a second inclined surface to receive the substance from the first surface the lower end of the first surface being vertically above the upper end of the second, means for maintaining the two adjacent ends of the surfaces at a given distance from each other, an intermediate inclined surface for bearing a flowing substance interposed between the lower end of the first surface and the upper end of the second and adapted to interrupt the flowing substance, a guide-piece opposed to the lower edge of the first inclined surface and means for conveying the substance received upon the guide-piece onto the second inclined surface at a point behind a vertical line beneath the delivery edge of the intermediate inclined surface, substantially as set forth.

4. In apparatus for the treatment of flowing substances the combination of an inclined surface to receive a flowing substance, a second inclined surface to receive the substance from the first surface the lower end of the first surface being vertically above the upper end of the second, means for maintaining the two adjacent ends of the surfaces at a given distance from each other, an intermediate inclined surface for bearing a flowing substance interposed between the lower end of the first surface and the upper end of the second and adapted to interrupt the flowing substance, a guide-piece opposed to the lower edge of the first inclined surface, means for conveying the substance received upon the guide-piece onto the second inclined surface at a point behind a vertical line beneath the delivery edge of the intermediate inclined surface and means for controlling the proportion of substance conveyed by the intermediate surface substantially as set forth.

5. In apparatus for the treatment of flowing substances the combination of an inclined surface to receive a flowing substance, a second inclined surface to receive the substance from the first surface the lower end of the first surface being vertically above the upper end of the second, means for maintaining the two adjacent ends of the surfaces at a given distance from each other, an intermediate inclined surface for bearing a flowing substance interposed between the lower end of the first surface and the upper end of the second and adapted to interrupt the flowing substance, a guide-piece opposed to the lower edge of the first inclined surface, means for conveying the substance received upon the guide-piece onto the second inclined surface at a point behind a vertical line beneath the delivery edge of the intermediate inclined surface and means for controlling the proportions of substance conveyed by the intermediate surface and guide-piece respectively substantially as set forth.

6. An apparatus for the treatment of flowing substances comprising an inclined surface B to receive a flowing substance, a second inclined surface B' to receive the flowing substance from surface B and a device for transposing the strata of the flowing substance comprising a back wall A between the surfaces B and B', a top wall E beyond the surface B, a bottom wall C forming a continuation of the second surface B', and intermediate shelf D between surfaces B and B', a passage D' between the surface B and shelf D, a passage E', $E^2$, $E^3$, extending from the surface B to the bottom wall C and a guide-wall $E^4$ on the top wall E substantially as set forth.

In testimony whereof we have signed our names to this specification in the presence of two subscribing witnesses.

WILLIAM JOHN ROBINSON.
HENRY HIGGINS.

Witnesses:
WILLIAM OLIVER,
WILLIAM ROBERTSON.